INVENTOR
STANFORD R. OVSHINSKY
by: Wallenstein, Spangenberg & Hattis ATTYS.

United States Patent Office 3,461,296
Patented Aug. 12, 1969

3,461,296

PHOTOCONDUCTIVE BISTABLE DEVICE

Stanford R. Ovshinsky, Birmingham, Mich., assignor, by mesne assignments, to Energy Conversion Devices, Inc. Troy, Mich., a corporation of Delaware Continuation-in-part of applications Ser. No. 118,642, June 21, 1961, Ser. No. 226,843, Sept. 28, 1962, Ser. No. 252,510, Jan. 18, 1963, Ser. No. 252,511, Jan. 18, 1963, Ser. No. 252,467, Jan. 18, 1963, Ser. No. 288,241, June 17, 1963, and Ser. No. 310,407, Sept. 20, 1963. This application Apr. 10, 1964, Ser. No. 358,697
Int. Cl. H01l *15/06;* H01j *39/12*
U.S. Cl. 250—211 10 Claims The application is a continuation-in-part of copending applications Ser. No. 118,642 filed June 21, 1961 and abandoned; Ser. No. 226,843 filed Sept. 28, 1962 and forfeited; Ser. No. 252,510 filed Jan. 18,1963 and abandoned; Ser. No. 252,511 filed Jan. 18, 1963 and forfeited; Ser. No. 252,467 filed Jan. 18, 1963 and abandoned; Ser. No. 228,241 filed June 17, 1963 and abandoned; and Ser. No. 310,407 filed Sept. 20. 1963, now U.S. Patent No. 3,271,591, granted Sept. 6, 1966.

The principal object of this invention is to provide automatic control of an electrical load circuit having an electrical load, to which a substantially constant voltage is applied by a substantially constant voltage source, by a light responsive current controlling device connected in series in the electrical load circuit for substantially instantaneously energizing the electrical load when the current controlling device is subjected to light of at least one predetermined value, a predetermined high value, and for substantially instantaneously deenergizing the electrical load when the current controlling device is subjected to light of at least another predetermined value, a predetermined low value.

Briefly, the light responsive current controlling device is symmetrical in its operation and comprises a semiconductor material and electrodes for electrically connecting the same in series in the electrical load circuit, and may be generally of the type referred to as a "Mechanism" device in the aforementioned copending applications. Such a current controlling device normally has a relatively high resistance and non-conducting state or condition, and it has a threshold voltage value at which it initially changes to a relatively low resistance state or condition to initially cause current conduction, the current conduction continuing until the current nears zero whereupon the device changes back to its relatively high resistance state or condition. When the device is included in an A.C. load circuit and after it has been initially made conducting at said threshold voltage value, which is referred to herein as the upper threshold voltage value, it has a lower threshold voltage value above which the device continues to change to its relatively low resistance or conducting state or condition for current conduction each half cycle and below which current conduction cannot take place. The difference between the upper and lower threshold voltage values may be made larger or small or even substantially zero in accordance with the uses to which the current controlling device is to be put.

In accordance with the instant invention, the upper and lower threshold voltage values of the current controlling device are lowered and raised in accordance with the light affecting the same. In this respect, the semiconductor material has a substantial light-resistance coefficient, as for example, a substantial negative light-resistance coefficient for decreasing and increasing the resistance thereof in its high resistance or blocking state or condition, and, hence, the upper and lower threshold voltage values as the light affecting the current controlling device increases and decreases, respectively. The semiconductor material in one state or condition has at least portions thereof between the electrodes normally in one state or condition which is of high resistance and substantially an insulator for blocking the flow of current therethrough substantially equally in each direction, i.e. in either direction or alternately in both directions below the upper threshold voltage value which is lowered and raised upon increase and decrease, respectively, in the light affecting the current controlling device. In another state or condition, the semiconductor material has at least portions thereof or paths between the electrodes in another state or condition which is of low resistance and substantially a conductor for conducting the flow of current therethrough substantially equally in each direction, i.e. in either direction or alternately in both directions above the lower threshold voltage value which is also lowered and raised upon increase and decrease in the light affecting the current controlling device.

Said at least portions or paths of said semiconductor material between the electrodes are controlled by the substantially constant voltage applied to the electrical load circuit, are initially substantially instantaneously changed from their blocking state or condition to their conducting state or condition when the upper threshold voltage value thereof is lowered to at least the substantially constant value of the applied voltage upon increase in the light affecting the current controlling device to at least said predetermined high light value, and are substantially instantaneouly changed from their conducting state or condition to their blocking state or condition when the lower threshold voltage value thereof is raised to at least the substantially constant value of the applied voltage upon decrease in the light affecting the current controlling device to at least said predetermined low light value. By appropriate selection of the semiconductor materials and/or by appropriate selection of the value of the applied voltage, the light values at which the devices are changed between their blocking and conducting states or conditions may be predetermined. By appropriate selection of the semiconductor materials and/or by appropriate selection of the value of the applied voltage, the values of the light intensities at which the devices are changed between their blocking and conducting states may be predetermined.

While this invention is applicable to the control of both D.C. and A.C. load circuits, electrical loads of the A.C. variety are particularly advantageously controlled by the light responsive control system of this invention and, in this respect, the substantially constant voltage source is an A.C. voltage source for applying a substantially constant A.C. voltage to the electrical load circuit which cooperates with decreasing and increasing threshold voltage values of said at least portions of the semiconductor material for energizing the A.C. electrical load when the current controlling device is affected by increase in the light to said predetermined high light value and for deenergizing the A.C. electrical load when the current controlling device is affected by decrease in the light to said predetermined low light value.

In such a light responsive A.C. control system, said at least portions or paths of the semiconductor material between the electrodes, when in their conducting state or condition above the lower threshold voltage value thereof, substantially instantaneously intermittently change to their blocking state or condition during each half cycle of the substantally constant A.C. voltage when the instantaneous A.C. current nears zero for intervals which may increase and decrease as the light affecting the current controlling device increases and decreases, respectively, above said low light value. Thus, the percent deenergization with respect to energization of the A.C. electrical load may be varied in accordance with the light affecting the current controlling device above said low light value to provide a modulation of the average electrical energy applied to the A.C. electrical load.

The light responsive current controlling device may be made responsive to the light of the environment affecting the same so as to be illuminated in accordance with the light of the environment for controlling the energization and deenergization of the electrical load in response to environment light.

Other objects and advantages of this invention will become apparent to those skilled in the art upon reference to the accompanying specification, claims and drawings in which:

Figure 1:
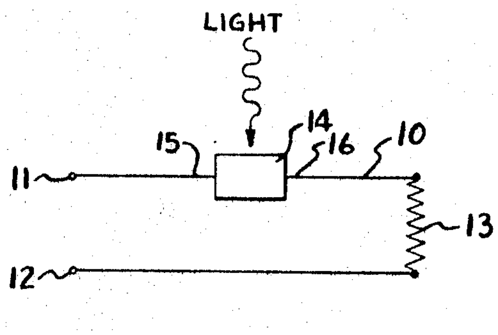
FIG. 1 is a wiring diagram of one form of the light responsive control system of this invention wherein the light responsive current controlling device is responsive to the light of the environment affecting the same.
Figure 4:
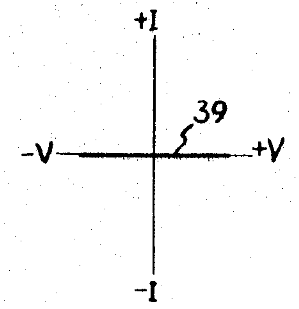
Figure 5:
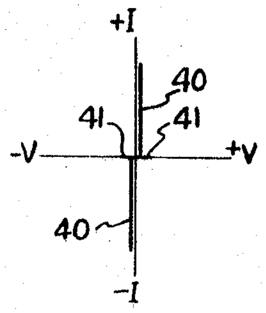
Figure 6:
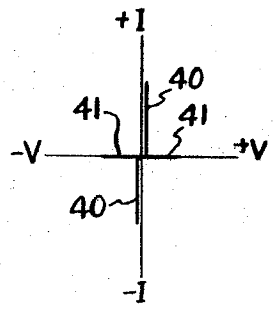
Figure 7:
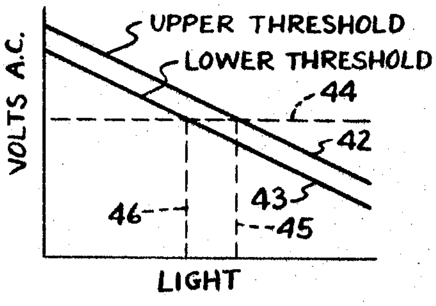

FIGS. 4, 5 and 6 are voltage-current curves illustrating the operation of the current controlling device of this invention when included in an A.C. load circuit, FIG. 4 illustrating the blocking state, FIG. 5 illustrating the modified conducting state adjacent or above the upper threshold voltage value, and FIG. 6 illustrating the modified conducting state as the lower threshold voltage value is approached;

FIG. 7 is a light voltage curve showing the light dependence of the current controlling device of this invention;

Referring first to FIG. 1, a load circuit is generally designated at 10, the load circuit being connected to terminals 11 and 12 which in turn are connected to a substantially constant source of A.C. voltage. The substantially constant A.C. voltage may be considered herein as the peak voltage which, of course, has direct relationship with the RMS voltage. Included in the load circuit 10 is a load resistance 13 which may be a resistor, a coil, a meter winding, a solenoid valve, a relay winding, or the like. A light responsive current controlling device 14 is connected in series in the load circuit 10 by leads 15 and 16. The current controlling device 14 has a negative light-resistance coefficient and responds to light affecting the same for lowering and raising the upper and lower threshold voltage values of the device for energizing and deenergizing the load resistance 13. The current controlling device 14 may respond to light conditions of the environment for controlling the load resistance 13, and the load-resistance 13, in turn, may, if desired, control the light of the environment. When the light of the environment increases to a predetermined value, the load resistance 13 is energized by the current controlling device 14 to decrease the light of the environment, and when the light of the environment is decreased to a predetermined value, the load resistance 13 is deenergized, and in this way the light of the environment may be maintained at desired values.

The current controlling devices of this invention are symmetrical in operation and may be generally of the type referred to as a "Mechanism" device in the aforementioned copending applications and they contain non-rectifying semiconductor materials and electrodes in non-rectifying contact therewith for controlling the current flow therethrough substantially equally in either or both directions. In their high resistance or blocking condition these materials may be crystalline like materials, or, preferably, materials of the polymeric type including polymeric networks and the like having covalent bonding and crosslinking highly resistant to crystallization, which are in a locally organized disordered solid state condition which is generally amorphous (not crystalline) but which may possibly contain relatively small crystals or chain or ring segments which would probably be maintained in randomly oriented position therein by the crosslinking. These polymeric structures may be one, two or three dimensional structures. While many different materials may be utilized, for example, these materials can be tellurides, selenides, sulfides or oxides of substantially any metal or metalloid, or intermetallic compound, or semiconductor or solid solutions or mixtures thereof, particularly good results being obtained where tellurium or selenium are utilized.

It is believed that the cooperating materials (metals, metalloids, intermetallic compounds or semiconductors), which may form compounds, or solid solutions or mixtures with the other materials in the semiconductor materials, operate, or have a strong tendency to operate, to inhibit crystallization in the semiconductor materials, and it is believed that this crystallization inhibiting tendency is particularly pronounced where the percentages of the materials are relatively remote from the stochiometric and eutectic ratios of the materials, and/or where the materials themselves have strong crystal inhibiting characteristics, such as, for example, germanium, arsenic, gallium and the like. As a result, where, as here, the semiconductor materials have strong crystallization inhibiting characteristics, they will remain in or revert to their disordered or generally amorphous state or condition.

The following are a few specific examples of some of the semiconductor materials of this invention which have given satisfactory results (the percentages being by weight):

25% arsenic and 75% of a mixture of 90% tellurium and 10% germanium; also with the addition of 5% silicon;
75% tellurium and 25% arsenic;
71.8% tellurium, 14.05% arsenic, 13.06% gallium and the remainder lead sulfide;
72.6% tellurium, 14.2% arsenic and 13.2% gallium;
72.6% tellurium, 27.4% gallium arsenide;
85% telliurm, 12% germanium and 3% silicon;
50% telliurm, 50% gallium;
67.2% tellurium, 25.3% gallium arsenide and 7.5% n-type germanium;
75% tellurium and 25% silicon;
75% tellurium and 25% indium antimonide;
55% tellurium and 45% germanium;
45% tellurium and 55% germanium;
75% selenium and 25% arsenic;
87% tellurium and 13% aluminum;
90% tellurium and 10% aluminum;
86% tellurium, 13% aluminum, 1% solenium;
50% tellurium, 50% aluminum;
50% aluminum telluride and 50% indium telluride;
50% aluminum telluride and 50% gallium telluride;

All of the aforementioned semiconductor material compositions, which are given by way of example, which are connected in series in the load circuit 10 by the electrodes, and which correspond to examples thereof disclosed in the aforementioned Patent No. 3,271,591, have threshold voltage values and operate to switch between the blocking condition and the conducting condition as described above and as described in said aforementioned patent without the need for light affecting the same. Thus, such semiconductor materials have means providing threshold voltage values for such switching regardless of light affecting the current controlling devices. At least some of the aforementioned semiconductor materials, such as those which contain selenium and lead sulfide, have negative light-resistance coefficients and are suitable for the purposes of the invention, especially in the light spectrum bordering on the infrared. Other semiconductor materials, such as, silver telluride, lead selenide, cadmium sulfide, zinc selenide and cadmium selenide, have large negative light-resistance coefficients and are particularly useful in this invention even though they themselves may not have means for providing threshold voltage values and switching. However, when such light sensitive semiconductor materials, as well as selenium and lead sulfide, are interposed between the electrodes with the above listed switching semiconductor materials, as by substitution therein or by addition thereto, the resultant semiconductor materials between the electrodes, in addition to having means for providing threshold voltage values and switching, also have means for providing a negative light-resistance coefficient for decreasing and increasing the resistance of the resultant semiconductor materials and for lowering and raising the threshold voltage values thereof as the value of the light intensity affecting the current controlling devices increases and decreases, respectively.

In forming the semiconductor materials of this invention, the materials may be ground in an unglazed porcelain morter to an even powder consistency and thoroughly mixed. They then may be heated in a sealed quartz tube to above the melting point of the material which has the highest melting point. The molten materials may be cooled in the tube and then broken or cut into pieces, with the pieces ground to proper shape to form bodies or pellets, or the molten materials may be cast from the tube into preheated graphite molds to form the bodies or pellets. The initial grinding of the materials may be done in the presence of air or in the absence of air, the former being preferable where considerable amounts of oxides are desired in the ultimate bodies or pellets. Alternatively, in forming the bodies or pellets it may be desirable to press the mixed powdered materials under pressures up to at least 1000 p.s.i. until the powdered materials are completely compacted, and then the completely compacted materials may be appropriately heated.

In some instances it has been found, particularly where arsenic is present in the bodies or pellets formed in the foregoing manner, that the bodies or pellets are in a disordered or generally amorphous solid state, the high resistance or blocking state. In such instances, bare electrodes can be and have been imbedded in the bodies or pellets during the formation of the bodies, and can be and have been applied to the surfaces of the bodies or pellets, to provide the solid state current controlling devices of this invention wherein the control of the electric current is accomplished in the bulk of the semiconductor materials.

In other instances, and it has been found that the bodies or pellets formed in the foregoing manner are in a crystalline like solid state, which may be a low resistance or conducting state, probably due to the slow cooling of the semiconductor materials during the formation of the bodies or pellets. In these instances it is necessary to change the bodies or pellets or portions thereof or the surfaces thereof to their disordered or generally amorphous state, and this may be accomplished in various ways, as for example; utilizing impure materials, adding impurities, including oxides in the bulk and/or in the surfaces or interfaces; mechanically by machining, sand blasting, impacting, bending, etching or subjecting to ultrasonic waves; metallurgically forming physical lattice deformations by heat treating and quick quenching or by high energy radiation with alpha, beta or gamma rays; chemically by means of oxygen, nitric or hydrofluoric acid, chlorine, sulphur, carbon, gold, nickel, iron or manganese inclusions, or ionic composition inclusions comprising alkali or alkaline earth metal compositions; electrically by electrical pulsing; or combinations thereof.

Where the entire bodies or pellets are changed in any of the foregoing manners to their disordered or generally amorphous solid state, bare electrodes may be embedded therein during the formation of the bodies or pellets and the current control by such solid state current controlling devices would be in the bulk. Another manner of obtaining current control in the bulk is to embed in the bodies or pellets electrodes which, except for their tips, are provided with electrical insulation, such as an oxide of the electrode material. Current pulses are then applied to the electrodes to cause the effective semiconductor material between the uninsulated tips of the electrodes to assume the disordered or generally amorphous state, the high resistance or blocking state.

The control of current by the current controlling devices of this invention can also be accomplished by surface or films of the semiconductor materials, particularly good results being here obtained. Here, the bodies or pellets of the semiconductor material, which are in a crystalline like solid state, may have their surfaces treated in the foregoing manners to provide surfaces or films which are in their disordered or generally amorphous solid state. Electrodes are suitably applied to the surfaces or films of such treated bodies or pellets, and since the bulk of the bodies or pellets is in the organied crystalline solid state (low resistance or substantially a conductor) and the surfaces or films are in the disordered or generally amorphous state (high resistance or substantially an insulator), the control of the current between the electrodes is mainly accomplished by the surfaces or films.

Instead of forming bodies or pellets, the foregoing semiconductor materials may be coated on a suitable smooth substrate, as by vacuum deposition or the like, to provide surfaces or films of the semiconductor material on the substrate which are in their disordered or generally amorphous solid state (high resistance or substantially an insulator). The semiconductor materials normally assume this state probably because of the rapid cooling of the materials as they are deposited or they may me readily made to assume such state in the manners described above. Electrodes are suitably applied to the surfaces or films on the substrate and the control of the current is accomplished by the surfaces or films. If the substrate is a conductor, the control of the current is through the surfaces or films between the electrodes and the substrate, and, if desired, the substrate itself may form an electrode. If the substrate is an insulator, the control of the current is along the surface or films between the electrodes. A particularly satisfactory device which is extremely accurate and repeatable in production has been produced by vapor depositing on a smooth substrate a thin film of tellurium, arsenic and germanium and by applying tungsten electrodes to the deposit film. The film may be formed by depositing these materials at the same time to provide a uniform and fixed film, or the film may be formed by depositing in sequence layers of tellurium, arsenic, germanium, arsenic and tellurium, and in the latter case, the deposited layers are then heated to a temperature below the sublimation point of the arsenic to unify and fix the film. The thickness of the surfaces or films, whether formed on the bodies or pellets by suitable treatment thereof or by deposition on substrates, may be in a range up to a thickness of a few ten thousands of an inch or even up to a thickness of a few hundreds of an inch or more.

The electrodes which are utilized in the controlling devices of this invention may be made of substantially any good electrical conductor, preferably high melting point materials, such as tantalum, graphite, tungsten, niobium and molybdenum. These electrodes are usually relatively inert with respect to the various aforementioned semiconductor materials.

The electrodes, when not embedded in the bodies or pellets in the instances discussed above, may be applied to the surfaces or films of bodies or pellets or to the surfaces or films deposited on the substrates in any desired manner, as by mechanically pressing them in place, by fusing them in place, by soldering them in place, by vapor deposition or the like. Preferably, after the electrodes are applied, a pulse of voltage and current is applied to the devices for conditioning and fixing the electrical contact between the electrodes and the semiconductor materials. The current controlling devices may be encapsulated if desired.

Figure 2:
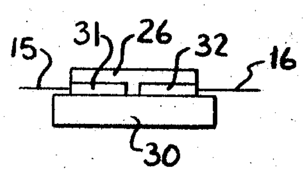
FIG. 2 is an illustration showing one form of the light responsive current controlling device which may be utilized in the instant invention.

For purposes of illustration herein, the control of the current in the load circuit 10 is disclosed as being accomplished essentially in a surface or film or layer of the semiconductor material, although, as expressed above, it may also be controlled in the bulk. Referring to FIG. 2, the current controlling device includes a substrate 30 of electrical insulating material, such as glass or the like, and suitably applied to the surface of this substrate is a pair of closely spaced electrodes 31 and 32. A layer or film 26 of semiconductor material in its disorder or generally amorphous state is applied on the substrate 30 over the electrodes 31 and 32. The leads 15 and 16 are connected to the electrodes 31 and 32 and the load circuit 10 of FIG. 1 extends from the lead 15 through the electrode 31 along the semiconductor material 26 and through the electrode 32 to the lead 16. Thus, the semiconductor material 26 between the electrodes 31 and 32 is connected in series in the load circuit 10 and is exposed to the light in the environment for the device 14 so as to be sensitive and responsive thereto.

It is believed that the generally amorphous polymeric like semiconductor materials have substantial current carrier restraining centers and a relatively large energy gap, that they have a relatively small mean free path for the current carriers, large spatial potential fluctuations and relatively few free current carriers due to the amorphous structure and the current carrier restraining centers therein for providing the high resistance or blocking state or condition. It is also believed that the crystalline like materials in their high resistance or blocking state or condition have substantial current carrier restraining centers and have a relatively large mean free path for the current carriers due to the crystal lattice structure and hence a relatively high current carrier mobility, but that there are relatively few free current carriers due to the substantial current carrier restraining centers therein, a relatively large energy gap therein, and large spatial potential fluctuations therein for providing the high resistance or blocking state or condition. It is further believed that the amorphous type semiconductor materials may have a higher resistance at the ordinary and usual temperatures of use, a greater nonlinear negative temperature-resistance coefficient, a lower heat conductivity coefficient, and a greater change in electrical conductivity between the blocking state or condition and the conducting state or condition than the crystalline type of semiconductor materials, and thus be more suitable for many applications of this invention. By appropriate selection of materials and dimensions, the high resistance values may be predetermined and they may be made to run into millions of ohms, if desired.

Figure 3:
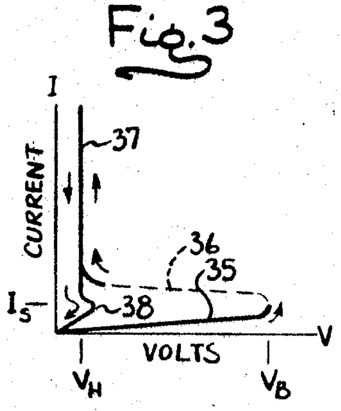
FIG. 3 is a voltage-current curve illustrating the instantaneous voltage and current characteristics of the current controlling device of this invention with a varying D.C. voltage applied thereto.

When the current controlling devices are placed in series in a load circuit to which a varying D.C. voltage is applied, they behave in the manner shown by the voltage-current curves of FIG. 3. At zero voltage, the semiconductor material is always in its high resistance or blocking state. As the applied voltage is increased, the resistance of at least portions or paths of the semiconductor material gradually decreases as indicated at 35 in FIG. 3. When the voltage applied to the semiconductor material reaches the point $V_B$ (the threshold or breakdown voltage value) said at least portions or paths of the semiconductor material between the electrodes (filaments or threads or paths between the electrodes) are substantially instantaneously changed to a low resistance or conducting state or condition for conducting current therethrough. It is believed that the applied voltage causes firing or breakdown or "switching" of said at least portions or paths of the semiconductor material and that the breakdown may be electrical or thermal or a combination of both. The "switching" times for switching from the blocking state or condition to the conducting state or condition are extremely short, substantially instantaneous. The substantially instantaneous switching of said at least portions or paths of the semiconductor material from their high resistance or substantially insulating state or condition to their low resistance or substantially conducting state or condition is depicted by the dotted curve 36 in FIG. 3.

The electrical breakdown may be due to rapid release, multiplication and conduction of current carriers in avalanche fashion under the influence of the applied electrical field or voltage, which may result from external field emission, internal field emission, impact or collison ionization from current carrier restraining centers (traps, recombination centers or the like), impact or collision ionization from valence bands, much like that occuring at breakdown in a gaseous discharge tube, or by lowering the height or decreasing the width of possible potential barriers and tunneling or the like may also be possible. It is believed that the local organization of the atoms and their spatial relationship in the crystal lattices in the crystalline type materials and the local organization and the spatial relationship between the atoms or small crystals or chain or ring segments in the amorphous type materials, a breakdown, are such as to provide at least a minimum mean free path for the current carriers released by the electrical field or voltage which is sufficient to allow adequate acceleration of the free current carriers by the applied electrical field or voltage to provide the impact or collision ionization and electrical breakdown. It is also believed that such a minimum mean free path for the current carriers may be inherently present in the amorphous structure and that the current conducting condition is greatly dependent upon the local organization for both the amorphous and crystalline conditions. As expressed above a relatively large mean free path for the current carriers can be present in the crystalline structure.

The thermal breakdown may be due to Joule heating of said at least portions or paths of the semiconductor material by the applied electrical field or voltage, the semiconductor material having a substantial non-linear negative temperature-resistance coefficient and a minimal heat conductivity coefficient, and the resistance of said at least portions or paths of the semiconductor material rapidly decreasing upon such heating thereof. In this respect, it is believed that such decrease in resistance increases the current and rapidly heats by Joule heating said at least portions or paths of the semiconductor material to thermally release the current carriers to be accelerated in the mean free path by the applied electrical field or voltage to provide for rapid release, multiplication and conduction of current carriers in avalanche fashion and, hence, breakdown, and, especially in the amorphous condition, the overlapping of orbitals by virtue of the type of local organization can create different sub-bands in the band structure.

It is also believed that the current so initiated between the electrodes at breakdown (electrically, thermally or both) causes at least portions or paths of the semiconductor material between the electrodes to be substantially instantaneously heated by Joule heat, that at such increased temperatures and under the influence of the electrical field or voltage, further current carriers are released, multiplied and conducted in avalanche fashion to provide high current density, and a low resistance or conducting state or condition which remains at a greatly reduced applied voltage. It is possible that the increase in mobility of the current carriers at higher temperature and higher electric field strength is due to the fact that the current carriers being excited to higher energy states populate bands of lower effective mass and, hence, higher mobility than at lower temperatures and electric field strengths. The possibility for tunneling increases with lower effective mass and higher mobility. It is also possible that a space charge can be established due to the possibility of the current carriers having different masses and mobilities and hence an inhomogeneous electric field could be established which would continuously elevate current carriers from one mobility to another in a regenerative fashion. As the current densities of the devices decrease, the current carrier mobilities decrease and, therefore, their capture possibilities increase. In the conducting state or condition the current carriers would be more energetic than their surroundings and would be considered as being hot. It is not clear at what point the minority carriers present could have an influence on the conducting process, but there is a possibility that they may enter and dominate, i.e. become majority carriers at certain critical levels.

It is further believed that the amount of increase in the mean free path for the current carriers in the amorphous like semiconductor material and the increased current carrier mobility are dependent upon the amount of increase in temperature and field strength, and it is possible that said a least portions or paths of some of the amorphous like semiconductor materials are electrically activated and heated to at least a critical transition temperature, such as a glass transition temperature, where softening begins to take place. Thus, due to such increase in mean free path for the current carriers, the current produced and released by the applied electrical field or voltage are rapidly released, multiplied and conducted in avalanche fashion under the influence of the applied electrical field or voltage to provide and maintain a low resistance or conducting state or condition.

The voltage across the device in its low resistance or substantially conducting state or condition remains substantially constant at $V_H$ although the current may increase and decrease greatly as indicated at 37 in FIG. 3. In this connection, it is believed that the conducting filaments or threads or paths between the electrodes increase and decrease in cross section as the current increases and decreases for providing the substantially constant voltage condition $V_H$. When the current through said at least portions or paths of the semiconductor material decreases to a critical value $I_S$ (minimum current holding value), it is believed that there is insufficient current to maintain the same in their low resistance or substantially conducting state or condition, whereupon they substantially instantaneously change or revert to their high resistance or blocking state or condition. In other words, the conducting filaments or threads or paths between the electrodes are interrupted when this condition occurs. This substantially instantaneous switching to the high resistance or substantially insulating state or condition is depicted bv the reverse curve 38 in FIG. 3. The decrease in current below the critical value $I_S$ may be brought about by decreasing the voltage applied to the electrodes of the device to a low value. Said at least portions or paths of the semiconductor material may again be substantially instantaneously changed to their low resistance or substantially conducting state or condition when they are again sufficiently activated by the voltage applied thereto. The voltage-current characteristics are not drawn to scale in FIG. 3 but are merely illustrative, for the ratio of insulating or blocking resistance to the resistance in the conducting state or condition is usually larger than 100,000:1. In its low resistance or conducting state or condition the resistance may be as low as 1 ohm or less as determined by the small voltage drop thereacross and the holding current for the device may be substantially zero.

The voltage-current characteristics of the current controlling devices of this invention are reversible and are generally independent of the load resistance and independent of whether D.C. or A.C. is used to traverse the I–V curve of FIG. 3. The manner in which the current controlling device of this invention operates in a load circuit powered by an A.C. voltage (FIG. 1) is illustrated by the voltage-current curves in FIGS. 4 to 6. When the current controlling device 14 is in its high resistance or blocking state or condition and the applied A.C. voltage is less than the threshold or breakdown voltage value of the device, the device remains in its high resistance or blocking state or condition as indicated at 39 in FIG. 4.

When, however, the applied A.C. voltage is at least the threshold voltage value of the device 14, the device initially and substantially instantaneously switches to its low resistance or conducting state or condition as indicated at 40 in FIG. 5. It is noted that the curves 40 are slightly offset from the center in FIG. 5 which represents the small resistance of about 1 ohm or less of the device 14 and the small and substantially constant voltage drop thereacross in its low resistance or conducting state or condition. It is also noted at 41 in FIG. 5 that the device intermittently assumes its high resistance or blocking state or condition during each half cycle of the A.C. voltage as the instantaneous voltage nears zero, the current being momentarily interrupted during each half cycle. However, following each momentary half cycle interruption of the current flow, the increasing instantaneous voltage of the applied A.C. voltage reactivates said at least portions or paths of the semiconductor material of the device 14 to cause the device substantially immediately to reconduct during each half cycle and provide a modified current conduction.

When the solid state current controlling device is in its modified low resistance or conducting state or condition and the applied A.C. voltage becomes less than the aforesaid threshold voltage value of the device (hereinafter referred to as the upper threshold voltage value), the intermittent periods near the zero point of the A.C. cycle at which the device is in its high resistance or blocking state or condition may be increased, as indicated at 41 in FIG. 6, thus providing a more pronounced modified current conducting condition. When the applied A.C. voltage becomes greater than the upper threshold voltage value, the intermittent periods may be decreased to provide a less pronounced modified current conducting condition. Accordingly, by relatively varying the applied A.C. voltage and the upper threshold voltage value of the current controlling device 14, the percent of blocking with respect to conducting of the current during each half cycle of the A.C. voltage and, hence, the average current conduction in the load circuit may be adjusted. When, however, the applied A.C. voltage becomes less than the upper threshold voltage value by a predetermined amount, the blocking period during each half cycle increases and the applied A.C. voltage does not generate sufficient power to reactivate said at least portions of the semiconductor material sufficiently to cause them to reconduct. This voltage value at which the device 14 fails to reconduct in the A.C. cycle is hereinafter referred to as the lower threshold voltage value of the device. The current controlling device 14 then assumes its high resistance or blocking state or condition as exhibited by the voltage-current curve of FIG. 4. After the current controlling device becomes non-conducting, it cannot again become conducting until the applied A.C. voltage becomes at least as great as the upper threshold voltage value of the device to produce the voltage-current curve of FIG. 5.

In summary, the solid state current controlling device is normally in its high resistance or blocking state or condition, is substantially instantaneously switched to its low resistance or conducting state or condition when the applied A.C. voltage becomes at least the upper threshold voltage value of the device, remains in its modified conducting state or condition when the applied A.C. voltage is above the lower threshold value, is substantially instantaneously switched to its high resistance or blocking state or condition when the applied A.C. voltage becomes at least less than the lower threshold voltage value of the device, and while in its low resistance or conducting state or condition with the applied A.C. voltage above the lower threshold voltage value of the device, the device provides a modulated current conduction which may depend upon the value of the applied A.C. voltage with respect to said lower threshold voltage value of the device.

The upper and lower threshold voltage values of the solid state current controlling device depend upon the resistance of the semiconductor material thereof in its high resistance or blocking state or condition, the higher the resistance the higher the threshold voltage values and the lower the resistance the lower the threshold voltage values. As expressed above, the semiconductor materials of the devices of the instant invention, because of the further inclusion between the electrodes of semiconductor materials having a negative light-resistance coefficient, have a substantial negative light-resistance coefficient, and, accordingly, the upper and lower threshold voltage values of the current controlling device will vary with the light affecting the same as illustrated by the curves 42 and 43 of FIG. 7, the upper and lower threshold voltage values decreasing as the light intensity increases and vice versa.

For purposes of illustration, it is assumed that the current controlling device 14 is subjected to the light of the environment (FIG. 1) and that it is desirable to have the device perform its current controlling functions in the A.C. load circuit 10 at a light intensity of about 1.00 candles/cm.$^2$. At a light intensity of .95 candle/cm.$^2$, the device 14 may have a blocking resistance of substantially 1.05 megohms, an upper threshold voltage value of 105 volts and a lower threshold voltage value of 100 volts, and at 1.00 candle/cm.$^2$ it may have a blocking resistance of substantially 1.0 megohm, an upper threshold voltage value of 100 volts and a lower threshold voltage value of 95 volts. With these parameters it is assumed that the voltage applied to the A.C. load circuit 10 is 100 volts A.C. as shown by the dotted curve 44 in FIG. 7, that the dotted line 45 represents 1.00 candle/cm.$^2$ and that the dotted line 46 represents .95 candle/cm.$^2$.

When the current controlling device 14 is in its high resistance or blocking state or condition and the light intensity is below 1.00 candle/cm.$^2$, the blocking resistance of the device 14 is above 1.0 megohm and the upper threshold voltage value is above the applied 100 volt A.C. voltage, and the device 14 remains in its high resistance or blocking state or condition. When the light intensity rises to 1.00 candle/cm.$^2$, the blocking resistance of the device 14 decreases to 1.0 megohm and the upper threshold voltage value decreases to 100 volts corresponding to the applied 100 volt A.C. voltage. When this occurs, the device 14 is substantially instantaneously switched to its low resistance or conducting state or condition for energizing the electrical load 13 in the A.C. load circuit 10. The device 14 will continue to conduct and maintain the electrical load 13 energized until such time as the light intensity decreases to .95 candle/cm.$^2$. When this occurs, the blocking resistance of the device 14 increases to 1.05 megohms and the lower threshold voltage value of the device 14 increases to 100 volts corresponding to the applied 100 volt A.C. voltage, and, as a result, the device 14 substantially instantaneously switches to its high resistance or blocking state or condition to deenergize the electrical load 13 in the load circuit 10. By appropriate selection of the semiconductor materials and dimensions thereof to provide desired blocking resistance values, desired response to light conditions and desired upper and lower threshold voltage values with respect to the substantially constant applied A.C. voltage, and/or by appropriate selection of the value of the applied A.C. voltage, the device 14 may be made to operate at substantially any desired light intensity value.

In this way the negative light-resistance coefficient of the semiconductor material of the device 14 and the light dependent upper and lower threshold voltage values thereof operate in conjunction with the substantially constant applied A.C. voltage for energizing and deenergizing the electrical load 13 in the load circuit 10 in accordance with the light affecting the device. Also, while the device 14 is in its modified low resistance or conducting state or condition above the lower threshold voltage value, it also operates to modulate the current conduction in the load circuit in accordance with the light affecting the device.

While for purposes of illustration one principal form of this invention has been disclosed, other forms thereof may become apparent to those skilled in the art upon reference to this disclosure and, therefore, this invention is to be limited only by the scope of the appended claims.

What is claimed is:

1. An electrical load circuit including in series a substantially constant voltage source for applying a substantially constant voltage thereto, an electrical load and a symmetrical light responsive current controlling device responsive to the intensity of external light affecting the same for substantially instantaneously energizing the electrical load when the current controlling device is subjected to at least a predetermined high light intensity value, said current controlling device being exposed to light and comprising non-rectifying semiconductor material and electrodes in non-rectifying contact therewith for electrically connecting the same in series in the electrical load circuit, said semiconductor material having means providing a threshold voltage value, said semiconductor material having means providing a negative light-resistance coefficient for decreasing and increasing the resistance thereof and for lowering and raising the threshold voltage value thereof as the value of the light intensity affecting the current controlling device increases and decreases respectively, said semiconductor material having at least portions thereof between the electrodes in one state which is of high resistance and substantially an insulator for blocking the flow of current therethrough substantially equally in each direction below the threshold voltage value which is lowered and raised upon increase and decrease in the value of the light intensity affecting the current controlling device, said semiconductor material having at least portions thereof between the electrodes in another state which is of low resistance and substantially a conductor for conducting the flow of current therethrough substantially equally in each direction, said at least portions of said semiconductor material being controlled by the substantially constant voltage applied to the electrical load circuit, and being substantially instantaneously changed from their blocking state to their conducting state when the threshold voltage value of the current controlling device is lowered to at least the substantially constant value of the applied voltage upon increase of the value of the light intensity affecting the current controlling device to at least said predetermined high light intensity value.

2. An A.C. electrical load circuit including in series a substantially constant A.C. voltage source for applying a substantially constant A.C. voltage thereto, an electrical load and a symmetrical light responsive current controlling device responsive to the intensity of external light affecting the same for substantially instantaneously energizing the electrical load when the current controlling device is subjected to at least a predetermined high light intensity value and for substantially instantaneously deenergizing the electrical load when the current controlling device is subjected to at least a predetermined low light intensity value, said current controlling device being exposed to light and comprising non-rectifying semiconductor material and electrodes in non-rectifying contact therewith for electrically connecting the same in series in the electrical load circuit, said semiconductor material having means providing upper and lower threshold voltage values, said semiconductor material having means providing a negative light-resistance coefficient for decreasing and increasing the resistance thereof and for lowering and raising the upper and lower threshold voltage values thereof as the value of the light intensity affecting the current controlling device increases and decreases respectively, said semiconductor material having at least portions thereof between the electrodes in one state which is of high resistance and substantially an insulator for blocking the flow of current therethrough substantially equally in each direction below the upper threshold voltage value which is lowered and raised upon increase and decrease in the value of the light intensity affecting the current controlling device, said semiconductor material having at least portions thereof between the electrodes in another state which is of low resistance and substantially a conductor for conducting the flow of current therethrough substantially equally in each direction above the lower threshold voltage value which is also lowered and raised upon increase and decrease in the value of the light intensity affecting the current controlling device, said at least portions of said semiconductor material being controlled by the substantially constant A.C. voltage applied to the electrical load circuit, and being substantially instantaneously changed from their blocking state to their conducting state when the upper threshold voltage value of the current controlling device is lowered to at least the substantially constant peak value of the applied A.C. voltage upon increase of the value of the light intensity affecting the current controlling device to at least said predetermined high light intensity value, and being substantially instantaneously changed from their conducting state to their blocking state when the lower threshold voltage value of the current controlling device is raised to at least the substantially constant peak value of the applied A.C. voltage upon decrease of the value of the light intensity affecting the current controlling device to at least said predetermined low light intensity value, said at least portions of said semiconductor material when in their conducting state substantially instantaneously intermittently changing to their blocking state during each half cycle of the substantially constant A.C. voltage when the instantaneous A.C. voltage nears zero for intervals which increase and decrease as the value of the light intensity affecting the current controlling device decreases and increases respectively.

3. An A.C. electrical load circuit including in series a substantially constant A.C. voltage source for applying a substantially constant A.C. voltage thereto, an electrical load and a symmetrical light responsive current controlling device responsive to the intensity of light affecting the same for substantially instantaneously energizing the electrical load when the current controlling device is subjected to at least a predetermined high light intensity value and for substantially instantaneously deenergizing the electrical load when the current controlling device is subjected to at least a predetermined low light intensity value, said current controlling device being exposed to light and comprising non-rectifying semiconductor material and electrodes in non-rectifying contact therewith for electrically connecting the same in series in the electrical load circuit, said semiconductor material having means providing upper and lower threshold voltage values, said semiconductor material having means providing a negative light-resistance coefficient for decreasing and increasing the resistance thereof and for lowering and raising the upper and lower threshold voltage values thereof as the value of the light intensity affecting the current controlling device increases and decreases respectively, said semiconductor material having at least portions thereof between the electrodes in one state which is of high resistance and substantially an insulator for blocking the flow of current therethrough substantially equally in each direction below the upper threshold voltage value which is lowered and raised upon increase and decrease in the value of the light intensity affecting the current controlling device, said semiconductor material having at least portions thereof between the electrodes in another state which is of low resistance and substantially a conductor for conducting the flow of current therethrough substantially equally in each direction above the lower threshold voltage value which is also lowered and raised upon increase and decrease in the value of the light intensity affecting the current controlling device, said at least portions of said semiconductor material being controlled by the substantially constant A.C. voltage applied to the electrical load circuit, and being substantially instantaneously changed from their blocking state to their conducting state when the upper threshold voltage value of the current controlling device is lowered to at least the substantially constant peak value of the applied A.C. voltage upon increase of the value of the light intensity affecting the current controlling device to at least said predetermined high light intensity value, and being substantially instantaneously changed from their conducting state to their blocking state when the lower threshold voltage value of the current controlling device is raised to at least the substantially constant peak value of the applied A.C. voltage upon decrease of the value of the light intensity affecting the current controlling device to at least said predetermined low light intensity value.

4. The combination of claim 1 including means for applying selected voltage values to the electrical load circuit for predetermining the value of the light intensity at which said at least portions of said semiconductor material are changed from their said blocking state to their said conducting state.

5. The combination of claim 3 including means for applying selected A.C. voltage values to the electrical load circuit for predetermining the values of the light intensities at which said at least portions of said semiconductor material are changed between their said blocking state and conducting state.

6. An A.C. electrical load circuit including in series a substantially constant A.C. voltage source for applying a substantially constant A.C. voltage thereto, an electrical load and a symmetrical light responsive current controlling device responsive to the intensity of light affecting the same for substantially instantaneously energizing the electrical load when the current controlling device is subjected to at least one predetermined light intensity value and for substantially instantaneously deenergizing the electrical load when the current controlling device is subjected to at least another predetermined light intensity value, said current controlling device being exposed to light and comprising non-rectifying semiconductor material and electrodes in non-rectifying contact therewith for electrically connecting the same in series in the electrical load circuit, said current controlling device having means providing upper and lower threshold voltage values and means for lowering and raising said threshold voltage values in accordance with variations in the light intensity values affecting the current controlling device, said semiconductor material having at least portions thereof between the electrodes in one state which is of high resistance and substantially an insulator for blocking the flow of current therethrough substantially equal to each direction below the upper threshold voltage value which is lowered and raised upon variations in the value of the light intensity affecting the current controlling device, said semiconductor material having at least portions thereof between the electrodes in another state which is of low resistance and substantially a conductor for conducting the flow of current therethrough substantially equally in each direction above a lower threshold voltage value which is also lowered and raised upon variations in the value of the light intensity affecting the current controlling device, said at least portions of said semiconductor material being controlled by the substantially constant A.C. voltage applied to the electrical load circuit, and being substantially instantaneously changed from their blocking state to their conducting state when the upper threshold voltage value of the current controlling device is lowered to at least the substantially constant peak value of the applied A.C. voltage upon change in the value of the light intensity affecting the current controlling device to at least said one predetermined light intensity value, and being substantially instantaneously changed from their conducting state to their blocking state when the lower threshold voltage value of the current controlling device is raised to at least the substantially constant peak value of the applied A.C. voltage upon change in the value of the light intensity affecting the current controlling device to at least said other predetermined light intensity value, said at least portions of said semiconductor material when in their conducting state substantially instantaneously intermittently changing to their blocking state during each half cycle of the substantially constant A.C. voltage when the instantaneous A.C. voltage nears zero for intervals which increase and decrease as the value of the light intensity affecting the current controlling device varies.

7. An A.C. electrical load circuit including in series a substantially constant A.C. voltage source for applying a substantially constant A.C. voltage thereto, an electrical load and a symmetrical light responsive current controlling device responsive to the intensity of light affecting the same for substantially instantaneously energizing the electrical load when the current controlling device is subjected to at least one predetermined light intensity value and for substantially instantaneously deenergizing the electrical load when the current controlling device is subjected to at least another predetermined light intensity value, said current controlling device being exposed to light and comprising non-rectifying semiconductor material and electrodes in non-rectifying contact therewith for electrically connecting the same in series in the electrical load circuit, said current controlling device having means providing upper and lower threshold voltage values and means for lowering and raising said threshold voltage values in accordance with variations in the light intensity values affecting the current controlling device, said semiconductor material having at least portions thereof between the electrodes in one state which is of high resistance and substantially an insulator for blocking the flow of current therethrough substantially equally in each direction below the upper threshold voltage value which is lowered and raised upon variations in the value of the light intensity affecting the current controlling device, said semiconductor material having at least portions thereof between the electrodes in another state which is of low resistance and substantially a conductor for conducting the flow of current therethrough substantially equally in each direction above a lower threshold voltage value which is also lowered and raised upon variations in the value of the light intensity affecting the current controlling device, said at least portions of said semiconductor material being controlled by the substantially constant A.C. voltage applied to the electrical load circuit, and being substantially instantaneously changed from their blocking state to their conducting state when the upper threshold voltage value of the current controlling device is lowered to at least the substantially constant peak value of the applied A.C. voltage upon change in the value of the light intensity affecting the current controlling device to at least said one predetermined light intensity value, and being substantially instantaneously changed from their conducting state to their blocking state when the lower threshold voltage value of the current controlling device is raised to at least the substantially constant peak value of the applied A.C. voltage upon change in the value of the light intensity affecting the current controlling device to at least said other predetermined light intensity value.

8. The combination of claim 6 including means for applying selected A.C. voltage values to the electrical load circuit for predetermining the values of the light intensities at which said at least portions of said semiconductor material are changed between their said blocking state and conducting state.

9. The combination of claim 7 including means for applying selected A.C. voltage values to the electrical load circuit for predetermining the values of the light intensities at which said at least portions of said semiconductor material are changed between their said blocking state and conducting state.

10. An A.C. electrical load circuit including in series a substantially constant A.C. voltage source for applying a substantially constant A.C. voltage thereto, an electrical load and a symmetrical light responsive current controlling device for substantially instantaneously energizing the electrical load when the current controlling device is subjected to at least one predetermined value of the light affecting the same and for substantially instantaneously deenergizing the electrical load when the current controlling device is subjected to at least another predetermined value of the light, said current controlling device being exposed to light and including non-rectifying semiconductor material means and electrodes in non-rectifying contact therewith for connecting the same in series in said load circuit, said semiconductor material means including means providing upper and lower threshold voltage values, said semiconductor material means including means for lowering and raising said threshold voltage values in accordance with variations in the value of the light affecting the current controlling device, said semiconductor material means including means for providing a first condition of relatively high resistance for substantially blocking the A.C. current therethrough between the electrodes substantially equally in both phases of the A.C. current below said upper threshold voltage value which is lowered and raised upon changes in the value of the condition affecting the current controlling device, said semiconductor material means including means responsive to an A.C. peak voltage of a value corresponding to the upper threshold voltage value of the current controlling device applied to said electrodes for altering said first condition of relatively high resistance of said semiconductor material means for substantially instantaneously providing at least one path through said semiconductor material means between the electrodes having a second condition of relatively low resistance for conducting A.C. current therethrough substantially equally in each phase of the A.C. current, said semiconductor material means being so controlled by the substantially constant A.C. peak voltage applied to the electrical load circuit when the upper threshold voltage value of the current controlling device is lowered to at least the value of the applied A.C. peak voltage by a change in the light affecting the current controlling device to said one predetermined value, said semiconductor material means including means for maintaining said at least one path of said semiconductor material means in its said second relatively low resistance conducting condition and providing a substantially constant ratio of voltage change to current change for conducting current at a substantially constant voltage therethrough between the electrodes substantially equally in each phase of the A.C. current which voltage is the same for increase and decrease in the instantaneous current above a minimum instantaneous current holding value, and providing a voltage drop across said at least one path in its second relatively low resistance conducting condition which is a minor fraction of the voltage drop across said semiconductor material means in its relatively high resistance blocking condition near said upper threshold voltage value, and said semiconductor material means including means responsive to a decrease in the instantaneous current, through said at least one path in its relatively low resistance conducting condition, to a value below said minimum instantaneous current holding value in each phase of the A.C. current for immediately causing realtering of said second relatively low resistance conducting condition of said at least one path to said first relatively high resistance blocking condition in each phase of the A.C. current for substantially blocking the A.C. current therethrough substantially equally in each phase of the A.C. current, said aforementioned means of said semiconductor material means continuing the aforesaid alteration of said first relatively high resistance blocking condition of said semiconductor material means and the aforesaid realteration of said second relatively low resistance conducting condition of said at least one path through said semiconductor material means during each phase of the A.C. voltage so long as the A.C. peak voltage remains above the lower threshold voltage value of the current controlling device, said semiconductor material means being so controlled by the substantially constant A.C. voltage applied to electrical load circuit until the lower threshold voltage value of the current controlling device is raised to at least the value of the applied A.C. peak voltage by a change in the light affecting the current controlling device to said other predetermined value.

References Cited

Photoconductivity of Solids, by Bube, John Wiley and Sons, pp 178–179, 1960.

ARCHIE R. BORCHELT, Primary Examiner

M. ABRAMSON, Assistant Examiner